(12) United States Patent
Custodio et al.

(10) Patent No.: US 12,353,430 B1
(45) Date of Patent: Jul. 8, 2025

(54) PROVISIONING A DATABASE MANAGEMENT PLATFORM IN A CLOUD COMPUTING ENVIRONMENT

(71) Applicant: FMR LLC, Boston, MA (US)

(72) Inventors: Jason A. Custodio, Manchester, NH (US); Raghu Kumar Thukral, Apex, NC (US); James Dooney, Somerville, MA (US); Victor Soohoo, Wellesley, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/772,509

(22) Filed: Jul. 15, 2024

(51) Int. Cl.
   *G06F 7/00* (2006.01)
   *G06F 9/50* (2006.01)
   *G06F 16/25* (2019.01)

(52) U.S. Cl.
   CPC .......... *G06F 16/256* (2019.01); *G06F 9/5077* (2013.01); *G06F 9/5072* (2013.01); *G06F 2209/5011* (2013.01); *G06F 2209/5014* (2013.01); *G06F 2209/508* (2013.01)

(58) Field of Classification Search
   CPC .... G06F 16/256; G06F 9/5077; G06F 9/5072; G06F 2209/5011; G06F 2209/5014; G06F 2209/508
   USPC ................. 707/610, 634, 770, 802, 999.003, 707/999.104, 17.014
   See application file for complete search history.

(56) References Cited

U.S. PATENT DOCUMENTS

| | | | |
|---|---|---|---|
| 9,021,046 B2 | 4/2015 | Mayo et al. | |
| 9,477,710 B2 | 10/2016 | Narasayya et al. | |
| 9,715,507 B2 | 7/2017 | Brand | |
| 10,554,750 B2 | 2/2020 | Vasyutynskyy | |
| 10,783,125 B2 | 9/2020 | Bester et al. | |
| 10,824,372 B2 | 11/2020 | Zhang et al. | |
| 10,826,975 B2 | 11/2020 | Revanuru et al. | |
| 10,885,023 B1 | 1/2021 | Gupta et al. | |
| 10,984,017 B1 | 4/2021 | Gilderman et al. | |

(Continued)

OTHER PUBLICATIONS

A. Bhattacharjee et al., "CloudCAMP: Automating Cloud Services Deployment & Management," arXiv:1904.02184v2 [cs.SE], Apr. 9, 2019, available at https://arxiv.org/pdf/1904.02184v2.pdf, 12 pages.

(Continued)

*Primary Examiner* — Md I Uddin

(74) *Attorney, Agent, or Firm* — Cesari and McKenna, LLP

(57) ABSTRACT

Methods and apparatuses for provisioning a database management platform in a cloud computing environment include a server that reserves virtual computing resources in the cloud environment. The server provisions a database management platform using the reserved virtual computing resources. The database management platform includes primary and secondary database instances, a database observer instance, and a platform monitor agent. The server configures a database observer instance to monitor availability of database instances and to route traffic to other database instances. The server integrates the database management platform with an identity authentication service, monitors operational status of the database management platform using a monitoring service, and refreshes the reserved virtual computing resources in the database management platform using a rehydration service.

18 Claims, 5 Drawing Sheets

(56) References Cited

U.S. PATENT DOCUMENTS

| | | |
|---|---|---|
| 11,178,252 B1 | 11/2021 | Devla et al. |
| 11,184,233 B1 | 11/2021 | Neelakantam et al. |
| 11,188,507 B2 | 11/2021 | Jaiswal et al. |
| 11,263,005 B2 | 3/2022 | Kunjuramanpillai et al. |
| 11,343,142 B1 | 5/2022 | Wang et al. |
| 11,392,366 B1 | 7/2022 | Wiegley |
| 11,675,812 B1 | 6/2023 | Prasad et al. |
| 11,775,334 B1* | 10/2023 | Doherty .............. H04L 41/5054 718/104 |
| 11,775,558 B1 | 10/2023 | Chitraputhiran et al. |
| 11,785,082 B2 | 10/2023 | Ahmad et al. |
| 11,803,411 B2 | 10/2023 | Dornemann et al. |
| 11,868,769 B1 | 1/2024 | Dongaonkar et al. |
| 2003/0014432 A1 | 1/2003 | Teloh et al. |
| 2003/0074463 A1* | 4/2003 | Swartz .................... H04L 41/06 709/230 |
| 2005/0193031 A1 | 9/2005 | Midgley et al. |
| 2007/0277010 A1 | 11/2007 | Anand et al. |
| 2012/0084261 A1 | 4/2012 | Parab |
| 2012/0136827 A1 | 5/2012 | Wang et al. |
| 2015/0341466 A1* | 11/2015 | Sah ........................ H04L 45/00 707/770 |
| 2016/0048408 A1 | 2/2016 | Madhu et al. |
| 2019/0166022 A1 | 5/2019 | Revanuru |
| 2019/0317866 A1 | 10/2019 | Zhou et al. |
| 2020/0142904 A1 | 5/2020 | Chen et al. |
| 2020/0233706 A1 | 7/2020 | Smith et al. |
| 2020/0301947 A1 | 9/2020 | Bolev et al. |
| 2021/0049035 A1 | 2/2021 | Beyer et al. |
| 2021/0096784 A1 | 4/2021 | Kailey et al. |
| 2022/0050703 A1 | 2/2022 | Woodhull |
| 2022/0052910 A1 | 2/2022 | Neelakantam et al. |
| 2022/0083432 A1 | 3/2022 | Mondal et al. |
| 2022/0414112 A1 | 12/2022 | Chandrasekaran et al. |
| 2023/0056223 A1 | 2/2023 | Kumar |
| 2023/0064421 A1 | 3/2023 | Mohanty et al. |
| 2023/0153120 A1 | 5/2023 | Lopez |
| 2023/0325405 A1 | 10/2023 | Chitraputhiran et al. |
| 2023/0409408 A1 | 12/2023 | Walshe et al. |
| 2024/0427784 A1* | 12/2024 | Rosendahl ............ G06F 16/256 |

OTHER PUBLICATIONS

S. Madanala, "Integrating Oracle Database with Microsoft Active Directory for Centrally Managed Users," blog post on Tangenz. com, Oct. 7, 2020, available at https://tangenz.com/applying-oracle-database-with-microsoft-active-directory/, 4 pages.

"Overview of Oracle Applications and solutions on Azure," Mar. 13, 2024, available at https://docs.microsoft.com/en-us/azure/virtual-machines/workloads/oracle/oracle-overview, 4 pages.

J. Liao et al., "Adaptive Replica Synchronization for Distributed File Systems," IEEE Systems Journal, vol. 9, Issue 3, Sep. 2015, pp. 865-877.

C.W. Kessler and E. Hansson, "Flexible Scheduling and Thread Allocation for Synchronous Parallel Tasks," ARCS 2012, Munich, Germany, 2012, pp. 1-7.

* cited by examiner

FIG. 4

PROVISIONING A DATABASE MANAGEMENT PLATFORM IN A CLOUD COMPUTING ENVIRONMENT

TECHNICAL FIELD

This application relates generally to methods and apparatuses, including computer program products, for provisioning a database management platform in a cloud computing environment.

BACKGROUND

Significant advances in computing and network technology over the last decade have contributed to the rise of cloud computing services and platforms. These cloud computing services enable enterprises to deploy and host their computing systems, applications, and related services (e.g., web servers, database servers, application servers) in a remote, shared, and often virtualized computing environment that does not need to be actively managed by the enterprise. Enterprises can thus take advantage of the immense computing power, memory storage, network bandwidth, and other highly scalable resources provided by such cloud computing services to provide a more flexible and efficient computing infrastructure for its employees and customers.

As a result, many enterprises have sought to automate deployment of key data processing applications and services—such as database management platforms like Azure Cloud Factory™ from Microsoft Corp.—to cloud environments. This endeavor has led to some technical challenges and obstacles. In one example, an enterprise may utilize application- or organization-specific database configurations or deployment pipelines for provisioning a database management platform in a cloud computing environment. Often, there are no tools available in the cloud computing platform to accomplish provisioning and deployment of the database management platform in an automated manner—for example, the cloud platform may not support deployment of pipelines or supporting infrastructure (e.g., virtual machines, endpoints, linked services) without appropriate owner or user approval. Therefore, manual, time-intensive and resource-intensive steps must be taken to both complete the initial provisioning and deployment, and to undertake ongoing maintenance and monitoring of the database management platform—which can lead to delays, errors, and lack of repeatability for such actions. In addition, the cloud computing platform may not have the out-of-the-box capability to integrate with other existing, on-premises enterprise systems (e.g., authentication, data security, application and network monitoring). Finally, depending upon the requirements of the locally-hosted computing systems, the cloud computing services may not be able to provide a level of service to meet service level agreement (SLA) requirements—for example, some systems may need resiliency options such as high-availability (HA) and failover/switchover protocols.

SUMMARY

Therefore, what is needed are methods and systems for deploying, provisioning, and managing cloud-based database management platforms automatically, overcoming the lack of existing tools to accomplish such tasks. The techniques described herein advantageously enable a framework of provisioning, managing, monitoring, and rehydrating database management platforms and their associated virtual computing resources through centralized pipelining and automated continuous integration (CI)/continuous deployment (CD) processes, onboarding of such cloud computing resources to an identity authentication service, and allowing for resiliency, failover, and site swapping to deliver seamless and uninterrupted availability of critical data processing resources.

The invention, in one aspect, features a system for provisioning a database management platform in a cloud computing environment. The system includes a server computing device having a memory for storing computer-executable instructions and a processor that executes the computer-executable instructions. The server computing device reserves a plurality of virtual computing resources in a cloud computing environment coupled to the server computing device, the cloud computing environment comprising a plurality of regions. The server computing device provisions a database management platform in the cloud computing environment using the reserved virtual computing resources. The database management platform comprises (i) a primary database instance provisioned in a first region, (ii) a secondary database instance provisioned in a second region; (iii) a database observer instance provisioned in the first region coupled to the primary database instance and the secondary database instance; and (iv) a platform monitor agent provisioned in each of the first region and the second region, including attaching the primary database instance and the secondary database instance to physical disk drives. The server computing device configures the database observer instance to monitor availability of the primary database instance and to route traffic to the secondary database instance upon detecting that the primary database instance is unavailable. The server computing device integrates the database management platform with an identity authentication service provided by a first computing resource of the server computing device. The server computing device monitors operational status of the database management platform using a monitoring service provided by a second computing resource of the server computing device, the monitoring service coupled to the platform monitor agent in each region. The server computing device refreshes one or more of the reserved virtual computing resources in the database management platform using a rehydration service provided by a third computing resource of the server computing device.

The invention, in another aspect, features a computerized method of provisioning a database management platform in a cloud computing environment. A server computing device reserves a plurality of virtual computing resources in a cloud computing environment coupled to the server computing device, the cloud computing environment comprising a plurality of regions. The server computing device provisions a database management platform in the cloud computing environment using the reserved virtual computing resources. The database management platform comprises (i) a primary database instance provisioned in a first region, (ii) a secondary database instance provisioned in a second region; (iii) a database observer instance provisioned in the first region coupled to the primary database instance and the secondary database instance; and (iv) a platform monitor agent provisioned in each of the first region and the second region, including attaching the primary database instance and the secondary database instance to physical disk drives. The server computing device configures the database observer instance to monitor availability of the primary database instance and to route traffic to the secondary database instance upon detecting that the primary database instance is unavailable. The server computing device integrates the database management platform with an identity authentication service provided by a first computing resource of the server computing device. The server computing device monitors operational status of the database management platform using a monitoring service provided by a second computing resource of the server computing device, the monitoring service coupled to the platform monitor agent in each region. The server computing device refreshes one or more of the reserved virtual computing resources in the database management platform using a rehydration service provided by a third computing resource of the server computing device.

Any of the above aspects can include one or more of the following features. In some embodiments, the server computing device invokes an application programming interface to connect to the cloud computing environment and issue a request to reserve the plurality of virtual computing resources. In some embodiments, the database management platform further comprises (v) an event manager agent provisioned in each of the first region and the second region, where the event manager agent in the first region captures usage and performance metrics for the primary database instance and the event manager agent in the second region captures usage and performance metrics for the secondary database instance, and where each event manager agent is coupled to the monitoring service of the server computing device. In some embodiments, the database management platform further comprises (vi) a second database observer instance provisioned in a third region of the cloud computing environment, the second database observer instance coupled to the primary database instance and the secondary database instance. In some embodiments, the database management platform further comprises (vii) a replication agent provisioned in the first region, wherein the replication agent detects changes to data in the primary database instance and replicates the changes in the secondary database instance.

In some embodiments, integrating the database management platform with an identity authentication service comprises establishing a connection between the database management platform and the first computing resource of the server computing device, and coupling the primary database instance and the secondary database instance to the identity authentication service such that authentication of requests to access the database instances is performed by the identity authentication service. In some embodiments, the server computing device executes a build pipeline script to initiate reserving of the virtual computing resources and provisioning of the database management platform.

In some embodiments, refreshing the reserved virtual computing resources in the database management platform comprises deleting one or more reserved virtual computing resources in the database management platform, and provisioning one or more new virtual computing resources in the database management platform using updated resource templates. In some embodiments, the updated resource templates comprise an operating system image file or a security patch image file.

In some embodiments, the server computing device validates the provisioning of the database management system in the cloud computing environment upon completion of the provisioning step. In some embodiments, the server computing device transmits a validation report to a remote computing device upon validating the provisioning of the database management system.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 4 is a diagram of an exemplary workflow script that can be executed by a provisioning module for deployment of a database management platform.

DETAILED DESCRIPTION

Figure 1:
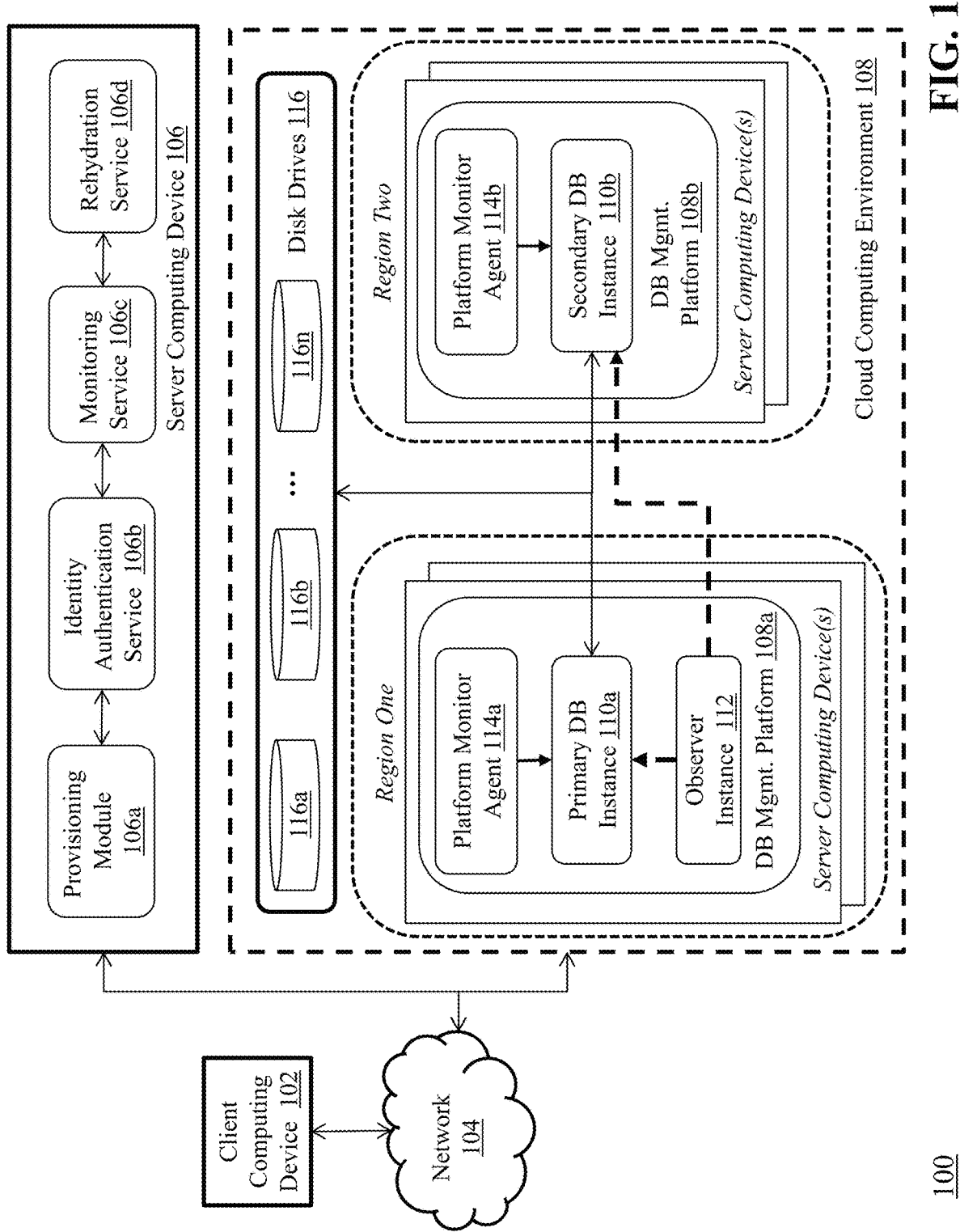
FIG. 1 is a block diagram of a system for provisioning a database management platform in a cloud computing environment.

FIG. 1 is a block diagram of system 100 for provisioning a database management platform in a cloud computing environment. System 100 includes client computing device 102 that is coupled via communications network 104 to server computing device 106 and cloud computing environment 108. Server computing device 106 includes provisioning module 106a, identity authentication service 106b, monitoring service 106c, and rehydration service 106d. Cloud computing environment 108 includes a plurality of virtual machines (VMs) 108a, 108b executing on one or more server computing devices in different regions in cloud computing environment 108. VM 108a in Region One includes primary database (DB) instance 110a, observer instance 112, and platform monitor agent 114a. VM 108b in Region Two includes secondary DB instance 110b, and platform monitor agent 114b. Cloud computing environment 108 further includes one or more physical disk drives 116a-116n (collectively, 116).

Client computing device 102 connects to communications network 104 in order to communicate with server computing device 106 and cloud computing environment 108 to provide input and receive output relating to the process of provisioning a database management platform in a cloud computing environment as described herein. Client computing device 102 can be coupled to a display device (not shown). For example, client computing device 102 can provide a detailed graphical user interface (GUI) via the display device that presents output resulting from the methods and systems described herein, where the GUI is utilized by an operator to review and monitor database management platform status information provided by server computing device 102 and/or cloud computing environment 108.

Exemplary client devices 102 include but are not limited to desktop computers, laptop computers, tablets, mobile devices, smartphones, and internet appliances. It should be appreciated that other types of computing devices that can connect to the components of system 100 can be used without departing from the scope of invention. Although FIG. 1 depicts a single client computing device 102, it should be appreciated that system 100 can include any number of client devices.

Communication network 104 enables the other components of system 100 to communicate with each other in order to perform the process of provisioning a database management platform in a cloud computing environment as described herein. Network 104 may be a local network, such as a LAN, or a wide area network, such as the Internet and/or a cellular network. In some embodiments, network 104 is comprised of several discrete networks and/or sub-networks (e.g., cellular to Internet) that enable the components of the system 100 to communicate with each other.

Server computing device 106 is a combination of hardware, including one or more special-purpose processors and one or more physical memory modules, and specialized software modules—such as modules 106a-106d—that are executed by a processor of server computing device 106, to receive data from other components of system 100, transmit data to other components of system 100, and perform functions for provisioning a database management platform in a cloud computing environment as described herein. In some embodiments, modules 106a-106d are specialized sets of computer software instructions programmed onto a dedicated processor in server computing device 106 and can include specifically designated memory locations and/or registers for executing the specialized computer software instructions. Further explanation of the specific processing performed by modules 106a-106d will be provided below.

Cloud computing environment 108 is a combination of hardware, including one or more special-purpose processors and one or more physical memory modules, and specialized software—such as virtual machines (VMs) 108a, 108b—that are executed by processor(s) of one or more server computing devices in cloud computing environment 108, to receive data from other components of system 100, transmit data to other components of system 100, and perform functions for provisioning a database management platform in a cloud computing environment as described herein. Each virtual machine 108a, 108b comprises a database (DB) instance 110a, 110b and a platform monitor agent 114a, 114b, while at least one virtual machine (in this example, VM 108a) includes an observer instance 112. In some embodiments, elements 110a-110b, 112, and 114a-114n comprise software modules such as one or more containers instantiated within virtual machines 108a, 108b that includes a plurality of files and configuration information (i.e., software code, environment variables, libraries, other dependencies, and the like). Cloud computing environment 108 can be configured to execute many instances of virtual machines 108a, 108b in isolation from each other, that access a single operating system (OS) kernel. In some embodiments, cloud computing environment 108 executes each VM 108a, 108b and/or the component elements 110a-110b, 112, and 114a-114b in a separate OS process, and constrains each element's access to physical resources (e.g., CPU, memory) of the corresponding server computing device so that a single virtual machine 108a-108b does not utilize all of the available physical resources. Upon execution, one or more server computing devices in cloud computing environment 108 executes application code and data stored in VMs 108a-108b for delivery, configuration, monitoring, presentation, and/or manipulation of the database management platform and associated data contained in, e.g., DB instances 110a, 110b by one or more endpoint devices. In one embodiment, cloud computing environment 108 is deployed using a commercially available cloud computing platform. As shown in FIG. 1, the resources of cloud computing environment 108 can be distributed into a plurality of regions which can be defined according to certain geographic and/or technical performance requirements. Each region can comprise one or more datacenters connected via a regional network that meets specific low-latency requirements. Inside each region, cloud computing environment 108 can be partitioned into one or more availability zones (AZ), which are physically separate locations used to achieve tolerance to, e.g., hardware failures, software failures, disruption in connectivity, unexpected events/disasters, and the like. Typically, the availability zones are connected using a high-performance network (e.g., round trip latency of less than two milliseconds). It should be appreciated that other types of computing resource distribution and configuration in a cloud environment can be used within the scope of the technology described herein.

Cloud computing environment 108 also comprises a plurality of disk drives 116a-116n (collectively, 116)—one or more of which are coupled to the database instances 110a, 110b of VMs 108a, 108b. Disk drives 116a-116n comprise physical disk drives (e.g., hard disk drives (HDD) and/or solid-state drives (SSD)) that are used by virtual machines 108a, 108b to store data elements associated with database instances 110a,110b. In the example of a cloud computing environment, these disk drives 116a-116n can be managed/shared disks used by a plurality of different resources or computing devices. Typically, a database instance 110a, 110b is attached to a particular disk drive 116a when initialized and is detached from the disk drive when the entire database management platform and/or one of the VMs 108a, 108b is removed, updated, re-initialized, or rehydrated.

As can be appreciated, system 100 of FIG. 1 can advantageously implement a number of automated workflows and processes to provision virtual machines 108a, 108b and the corresponding elements 110a-110b, 112, 114a-114b in a cloud computing environment 108, instead of relying on manually-invoked jobs and user-based monitoring and intervention to dynamically allocate the computing resources, infrastructure, and security requirements needed to instantiate virtual machines 108a, 108b and the corresponding elements 110a-110b, 112, 114a-114b within the cloud environment 108.

Figure 2:
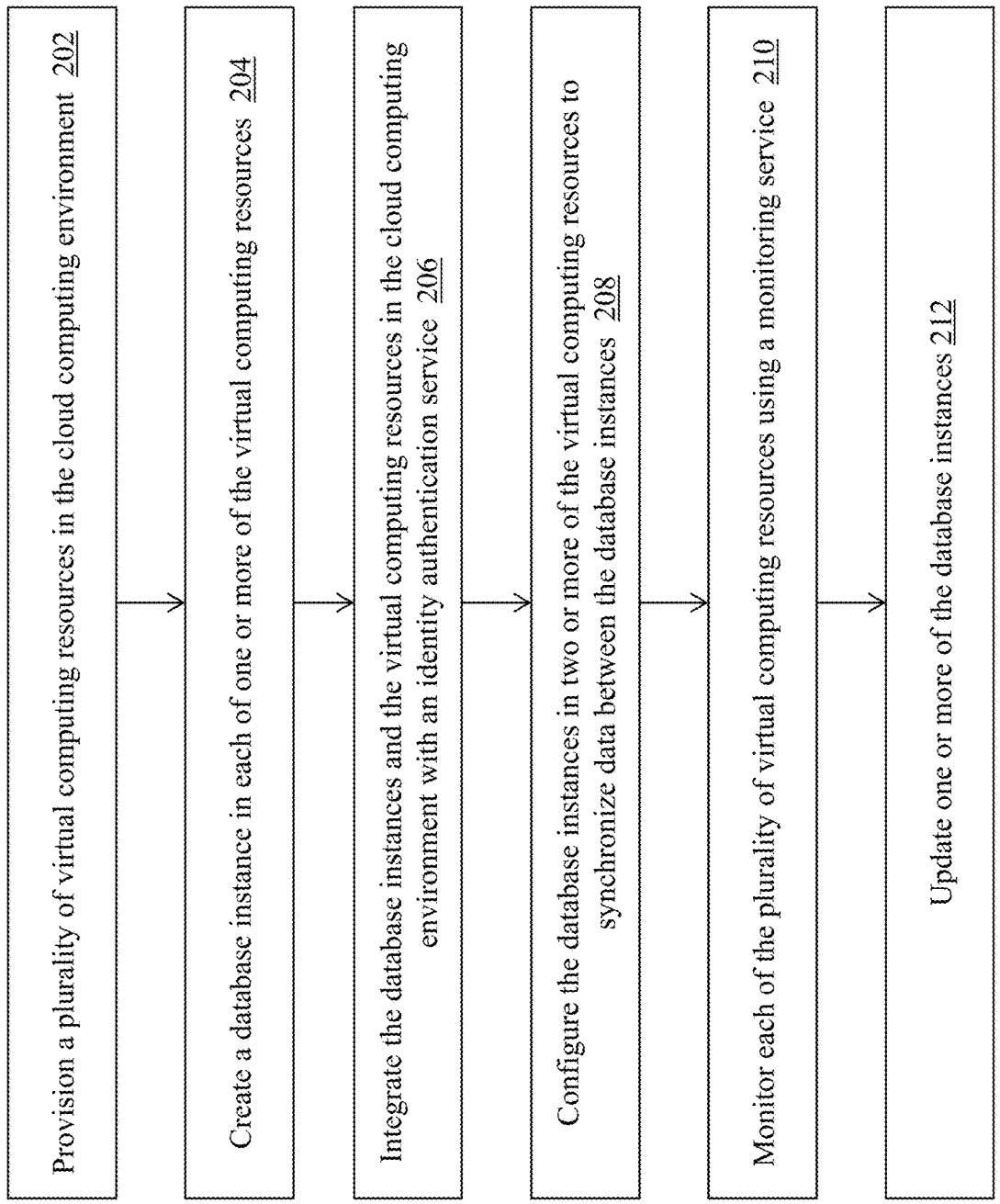
FIG. 2 is a flow diagram of a computerized method of provisioning a database management platform in a cloud computing environment.

FIG. 2 is a flow diagram of a computerized method 200 of provisioning a database management platform in a cloud computing environment, using system 100 of FIG. 1. In one example, a user at client computing device 102 establishes a connection to server computing device 106 via network 104 to initiate deployment of a new database management platform and/or rehydrate an existing database management platform in cloud computing environment. In some embodiments, the user at client computing device 102 launches a deployment orchestration tool that is either installed on client computing device 102 or made available by server computing device 106. For example, the user at client computing device 102 can open browser software and enter an address (e.g., URL) that points to a web-based interface provided by server computing device 106. The web-based interface can receive a request from client computing device 102 via the URL and respond with a graphical user interface (e.g., webpage) that is presented on client computing device 102 which enables the user to initiate deployment and/or reconfiguration of a database management platform in cloud computing environment 108. In one embodiment, provisioning module 106a determines a role of the user at client computing device 102 (e.g., using authentication credentials and/or a user profile provided by the client computing device) and enables user access to provisioning and deployment of software features (e.g., code files, binaries, libraries, etc.) that, when executed, configure the database management platform in cloud environment 108. Using the deployment orchestration tool, the user can initiate one or more deployment automation pipeline workflows to be used in deploying the database management platform. Exemplary deployment orchestration tools include but are not limited to DevOps automation tools, such as Jenkins™ (available at www.jenkins.io) and/or UrbanCode Deploy™ (uDeploy) (available at www.urbancode.com/product/deploy), which enable the user to build, test, and execute a code base that deploys a database management platform to cloud environment 108.

In some embodiments, the code base includes one or more templates which enable the provisioning and automatic deployment of a database management platform to cloud computing environment 108, including identification of multiple objects, services, instances (and their dependencies)—i.e., DB instances 110a, 110b, observer instance 112, and platform monitor agents 114a, 114b—for the database management platform. The template(s) can be used each time a database management platform is deployed in cloud environment 108. The template(s) can be preconfigured in cloud environment 108 to provide specific computing resources, memory allocations, deployment instructions, configuration settings, and so forth. In some embodiments, provisioning module 106a can provision the database management platform using the template(s) in conjunction with one or more application images retrieved from, e.g., a local or remote image repository. In some embodiments, the code base used to deploy the database management platform is part of a continuous integration/continuous delivery (CI/CD) process, in which changes, updates, and improvements are continuously made to the code base-which can be frequently executed to re-configure and enhance the deployed database management platform in the cloud environment. As mentioned above, deployment of the database management platform includes the provisioning of the underlying elements in the platform-such as DB instances 110a, 110b, observer instance 112, and platform monitor agents 114a, 114b with corresponding VMs 108a, 108b.

Figure 3:
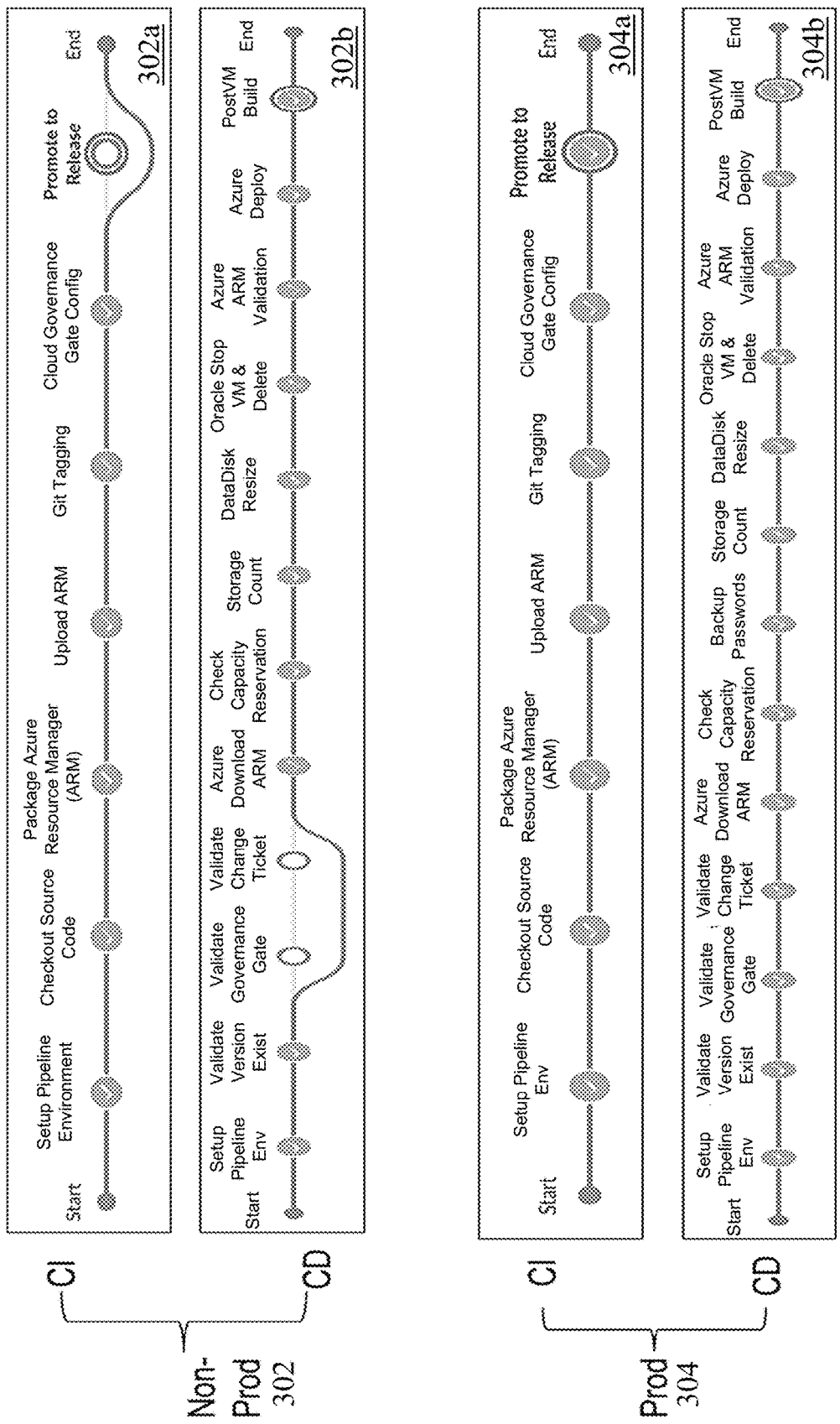
FIG. 3 is a diagram of exemplary deployment automation pipeline workflows that can be executed by a provisioning module to deploy a database management platform.

FIG. 3 is a diagram of exemplary deployment automation pipeline workflows that can be executed by provisioning module 106a to deploy the database management platform including the associated VMs 108a-108b, DB instances 110a-110b, observer instance 112, and platform monitor agents 114a-114b—to cloud computing environment 108. FIG. 3 depicts two pipeline workflows for deployment of a database management platform (such as Oracle® Database) in the Microsoft® Azure™ cloud environment: a non-production environment workflow 302 and a production environment workflow 304. Each of the workflows 302, 304 includes two phases: a continuous integration (CI) phase (302a, 304a respectively) and a continuous deployment (CD) phase (302b, 304b respectively). The continuous integration phase 302a, 304a includes process steps for preparing, packaging, and promoting the source code to be used as part of the database management platform deployed to cloud environment 108. The continuous deployment phase 302b, 304b includes process steps for reserving cloud environment resources (such as VMs 108a, 108b), validating the packaged source code, and configuring and deploying the database management platform in cloud environment 108. As can be appreciated, the CI and CD phases in the non-production workflow 302 differ slightly from the CI and CD phases in the production workflow 304. For example, in the CI phase 302a of the non-production workflow 302, provisioning module 106a does not execute the 'promote to release' step-because this workflow is not intended to deploy code to production, the code does not need to be promoted to a release version in the source code management system. In contrast, in the CI phase 304a of the production workflow 304, provisioning module 106a executes the 'promote to release' step because the packaged code is intended for release to the production environment.

Figure 4:
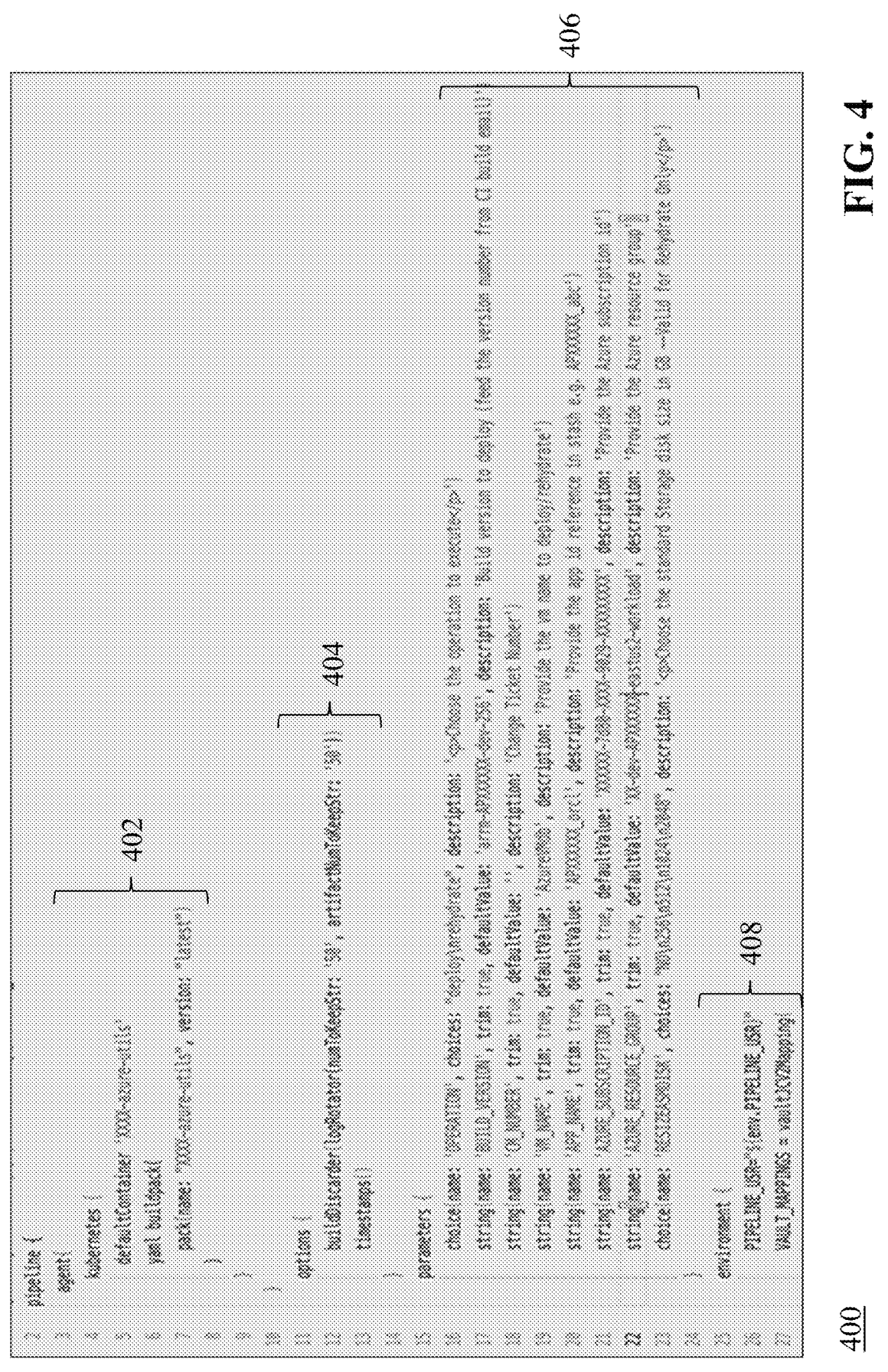

In the CD phase 302b of the non-production workflow 302, provisioning module 106a does not execute the 'validate governance gate' and 'validate change ticket' steps-because these steps are not required for deployment of code to a non-production environment. However, in the CD phase 304b of the production workflow 304, provisioning module 106a executes the 'validate governance gate' and 'validate change ticket' steps to ensure that the code meets all organizational and development requirements before it is deployed to the production environment. The CD phase 304b also includes the step of 'backup passwords' which is not part of the CD phase 302b in the non-production workflow 302. In some embodiments, the workflows are each defined in a script that comprises a plurality of instructions, commands, and/or references that are used by provisioning module 106a for deployment of the database management platform. FIG. 4 is a diagram of an exemplary workflow script 400 that can be executed by provisioning module 106a for deployment of a database management platform in cloud computing environment 108. As shown in FIG. 4, the script 400 includes sections for build options 424, deployment parameters 406, and pipeline environment 408.

Upon completion of the continuous integration phase of the deployment workflow, provisioning module 106a initiates execution of the continuous deployment phase of the workflow—which includes code validation, capacity reservation, and deployment of the packaged code to cloud computing environment 108. Provisioning module 106a of server computing device 106 reserves (step 202) a plurality of virtual computing resources in a cloud computing environment (i.e., environment 108). As described above, each database management platform that is deployed to cloud computing environment 108 utilizes physical resources such as CPU cores and memory of server computing devices in the environment. As can be appreciated, the cost to use many commercially available cloud computing platforms depends upon the data storage space, virtual machine (VM) size, processor usage, memory resources, and other capacity requirements imposed by the applications and/or functionality that the end user wishes to deploy in the cloud environment. To ensure that the cloud computing environment 108 has sufficient capacity for hosting and execution of the database management platform in a configuration requested by an end user, provisioning module 106a connects to cloud computing environment 108 (e.g., via an application programming interface (API)) and issues one or more requests to reserve resource capacity (e.g., specifying information such as VM size, region, and quantity of instances to be reserved) in the cloud environment prior to deployment of a new database management platform and/or updating/rehydrating an already deployed platform. In some embodiments, upon connecting to cloud computing environment 108, provisioning module 106a authenticates to environment 108 using specified authentication credentials associated with, e.g., a user of client computing device 102 and/or an organization that has an account with the corresponding cloud provider. As can be appreciated, cloud computing environment 108 can respond to the capacity reservation request with an acceptance (indicating that the cloud environment has sufficient capacity available to successfully deploy the database management platform using the criteria specified in the request) or a failure (indicating that the cloud environment does not have capacity available that meets the request). For example, a capacity reservation could fail if the account does not have an adequate subscription quota for the requested VM size, location, or zone combination.

After reserving the virtual computing resources, provisioning module 106a provisions (step 204) a database management platform in cloud computing environment 108 using the reserved virtual computing resources (i.e., VMs 108a, 108b). As one example, provisioning module 106a continues with the CD pipeline workflow and transmits instructions to cloud computing environment 108 to create a virtual computing resource (e.g., VM 108a, 108b) in one or more regions with a configuration that matches the reservation. In some embodiments, provisioning module 106a includes a reference to the reservation (e.g., a reservation ID) in the instructions so that cloud computing environment 108 can associate the VM 108a, 108b with the reservation.

Provisioning module 106a deploys database management platform to one or more virtual computing resources (i.e., VMs 108a, 108b) associated with the reservation. As described above, database management platforms include (i) a primary database instance 110a provisioned in a first region (Region One), (ii) a secondary database instance 110b provisioned in a second region; (iii) a database observer instance 112 provisioned in the first region coupled to the primary database instance 110a and the secondary database instance 110b; and (iv) a platform monitor agent 114a, 114b provisioned in each of the first region and the second region, including attaching the primary database instance 110a and the secondary database instance 110b to one or more physical disk drives 116. In some embodiments, the VMs 108a, 108b used to deploy the database management platform are newly created and provisioning module 106a does not need to modify or delete any existing infrastructure in cloud computing environment 108 to accommodate the database management platform. In some embodiments, provisioning module 106a is modifying an existing database management platform (e.g., updating a version of one or more components of the platform and/or rehydrating one or more elements of the platform). In these embodiments, provisioning module 106a can delete one or more existing infrastructure components (e.g., VMs, instances) in order to complete the modification.

Generally, the deployment of the database management platform can include actions such as installing, configuring, and validating the database instances 110a, 110b in the corresponding VMs 108a, 108b; installing and configuring the platform monitoring agents 114a, 114b in the corresponding regions; and installing the observer instance 112. As mentioned previously, provisioning module 106a uses the pipeline workflow script to execute each step of the deployment using the packaged source code identified in the script.

As shown in FIG. 1, DB instance 110a is configured as the primary instance and DB instance 110b is configured as the secondary (or backup) instance. In some embodiments, secondary DB instance 110b is configured as a replica of primary DB instance 110a in order to provide failover and fault tolerance in the event of a failure in instance 110a e.g., if DB instance 110a and/or the underlying VM 108a fails or is otherwise experiencing technical issues, system 100 can route data requests to secondary DB instance 110b to ensure uninterrupted service for end users. In some embodiments, system 100 further includes a replication agent provisioned in the VM 108a of the primary database instance 110a that is configured to detect changes to data in the primary database instance 110a and replicate the changes in the secondary database instance 110b. For example, as users interact with data in the primary database instance 110a, the users can add new data, update and/or delete existing data. In order to seamlessly captures these data changes in secondary database instance 110b, the replication agent continuously (or periodically) transmits instructions to secondary database instance 110b to make the corresponding data changes in that instance. As can be appreciated, in some embodiments the functions of the replication agent can be deployed as part of the primary database instance 110a.

In some embodiments, provisioning module 106a connects primary DB instance 110a and secondary DB instance 110b to one or more disk drives 116. In some embodiments, provisioning module connects to each of the VMs 108a, 108b and creates a database instance (i.e., instances 110a, 110b) using, e.g., a database image retrieved from a local or remote image repository. For example, provisioning module 106a can retrieve a database image and deploy the database image into a VM. The database image can be a default database image used in the cloud environment 108 or a customized database image (either newly created for use in the cloud environment 108, uploaded from the server computing device 106, or selected from a network repository). In one example, the database image can be a database-specific Linux™ image that corresponds to a particular database version. In another example, the database image can be a non-database specific Linux image and/or a custom image. As part of creating the database instances, provisioning module 106a attaches one or more storage disks (e.g., disk drives 116) to each of the database instances 110a, 110b for use as physical storage locations for the database instances. During database instance creation, provisioning module 106a can connect to the disk drives 116, determine characteristics like storage capacity, latency, bandwidth, availability, and the like for each disk drive, and select one or more disk drives/locations to attach to each database instance.

Once the database management platform is provisioned, provisioning module 106a configures (step 206) the database observer instance 112 to monitor availability of the primary database instance 110a and to route traffic to the secondary database instance 110b upon detecting that the primary database instance 110a is unavailable. As shown in FIG. 1, observer instance 112 is deployed in VM 108a of Region One and is coupled to each of primary DB instance 110a and secondary DB instance 110b. However, in some embodiments observer instance 112 can be deployed in VM 108b of Region Two, a different VM in Region One or Region Two, or a VM in a different region (Region Three (not shown)). Observer instance 112 monitors messages and calls generated by primary DB instance 110a to determine whether instance 110a is online/operating within accepted performance targets (e.g., bandwidth, latency, transaction speed); or whether the instance 110a is offline/experiencing errors or corruption that would require failover to another instance (i.e., secondary DB instance 110b). In some embodiments, when observer instance 112 identifies a condition in DB instance 110a that triggers the failover process (e.g., offline, corrupted file, inaccessible log file, or other failure condition), observer instance 112 stops primary DB instance 110*a* from receiving any further requests by routing requests intended for instance 110*a* to secondary DB instance 110*b*. Observer instance 112 can continue to monitor primary DB instance 110*a* and reverse the failover upon detecting that primary instance 110*a* has resumed normal operation.

Continuing with FIG. 2, provisioning module 106*a* integrates (step 306) the deployed database management platform (i.e., resources 110*a*-110*b*, 112, and 114*a*-114*b*) in the cloud environment 108 with identity authentication service 106*b* of server computing device 106. For example, in some infrastructures, server computing device 106 can maintain an on-premises user access management module such as identity authentication service 106*b*. To ensure seamlessness and uniformity of access control from on-premises to cloud, it is desirable to synchronize user accounts between the local identity authentication service 106*b* and the cloud environment 108. This also enables users to access DB instances 110*a*, 110*b* according to the specific permissions/roles assigned to them in the on-premises system. In some embodiments, identity authentication service 106*b* is configured to connect to the cloud environment 108 and establish a link relationship between a user of the identity authentication service 106*b* and a corresponding cloud representation of the user (that is maintained by the cloud service provider). The configuration of the cloud environment 108 enables each of the components of the database management platform to access the user access information when responding to requests (e.g., data read/write/update requests, application execution, etc.) that require access to data (e.g., via disk drives 116). Then, when access changes are made to the users in identity authentication service 106*b*, those changes are synchronized automatically to the cloud environment 108.

As can be appreciated, a benefit of implementing resources and services in a cloud computing environment is the ability to create redundancy and failover infrastructures so that critical enterprise data pipelines and applications do not experience any interruptions in service. During initial deployment and/or during subsequent updates, provisioning module 106*a* can configure the cloud environment 108 (including VMS 108*a*, 108*b* and corresponding elements 110*a*-110*b*, 112, and 114*a*-114*b*) according to any of a number of different high availability patterns so that data processing features and pipelines remain consistent and able to be accessed across different platforms and/or regions in cloud computing environment 108.

In one example, VM 108*a* may experience an error or technical problem that prevents normal operation (e.g., failure of cloud hardware, network connectivity issues, etc.). In such events, it is crucial to seamlessly swap from VM 108*a* in one region to another VM 108*b* (also called site switching) in a different region so that system operation and availability is not affected. In some embodiments, the site switching process includes the requirement to disable a first database instance (e.g., 110*a*) in the VM that is experiencing problems and enable corresponding database instance(s) (e.g., 110*b*) in another VM.

As can be appreciated, such high availability patterns provide several technical advantages to the overall system 100. Once a high availability pattern is set up, monitoring service 106*c* of server computing device 106 connects to each of the platform monitor agents 114*a*, 114*b* deployed in cloud environment 108 to monitor (step 210 of FIG. 2) each of the corresponding VMs 108*a*, 108*b*. For example, monitoring service 106*c* can actively track characteristics of the database management platform, including the VMs 108*a*, 108*b* and their associated computing resources in cloud computing environment 108, such as functional status, memory load, data errors, network connectivity, bandwidth, processing overhead, usage, data processing requests, online/offline status, and the like. In some embodiments, monitoring service 106*c* can receive one or more log files generated by platform monitor agents 114*a*, 114*b* and analyze the log files to determine the above characteristics as part of the monitoring process.

In some embodiments, each region of the cloud computing environment 108 can include an event manager agent provisioned to capture usage and performance metrics for the primary database instance 110*a* and the secondary database instance 110*b*, respectively. Each event manager agent can be coupled to monitoring service 106*c* for transmission of the usage and performance metrics to monitoring service 106 for analysis. For example, the event manager agent can capture data relating to, e.g., user connections, transaction load (e.g., reads/writes), data errors, transaction latency, and other types of database statistics. In some embodiments, the functions of the event manager agent can be combined with the platform monitor agent 114*a*, 114*b* that is deployed in the corresponding VM.

Upon detecting an undesirable or adverse condition of one or more of the VMs 108*a*, 108*b* (such as a computing resource failure) and/or the database instances 110*a*, 110*b* (such as a data read/write error), monitoring service 106*c* can redirect traffic from the failing VM 108*a* in one region to another VM 108*b* in another region in order to maintain continuity of data processing availability and system functionality. In some embodiments, monitoring service 106*c* can additionally transmit alert messages received from one or more of platform monitor agents 114*a*, 114*b* via an established connection when a failure event occurs at the associated VMs 108*a*, 108*b*. The alert message can be transmitted to, e.g., an end user device such as client computing device 102 so that system administrators and other personnel can be informed of the service interruption. Alert messages can also be generated and transmitted by monitoring service 106*c* in the event that failures or errors are detected at one or more disk drives 116 and/or other system resources that are connected to cloud environment 108.

Figure 5:
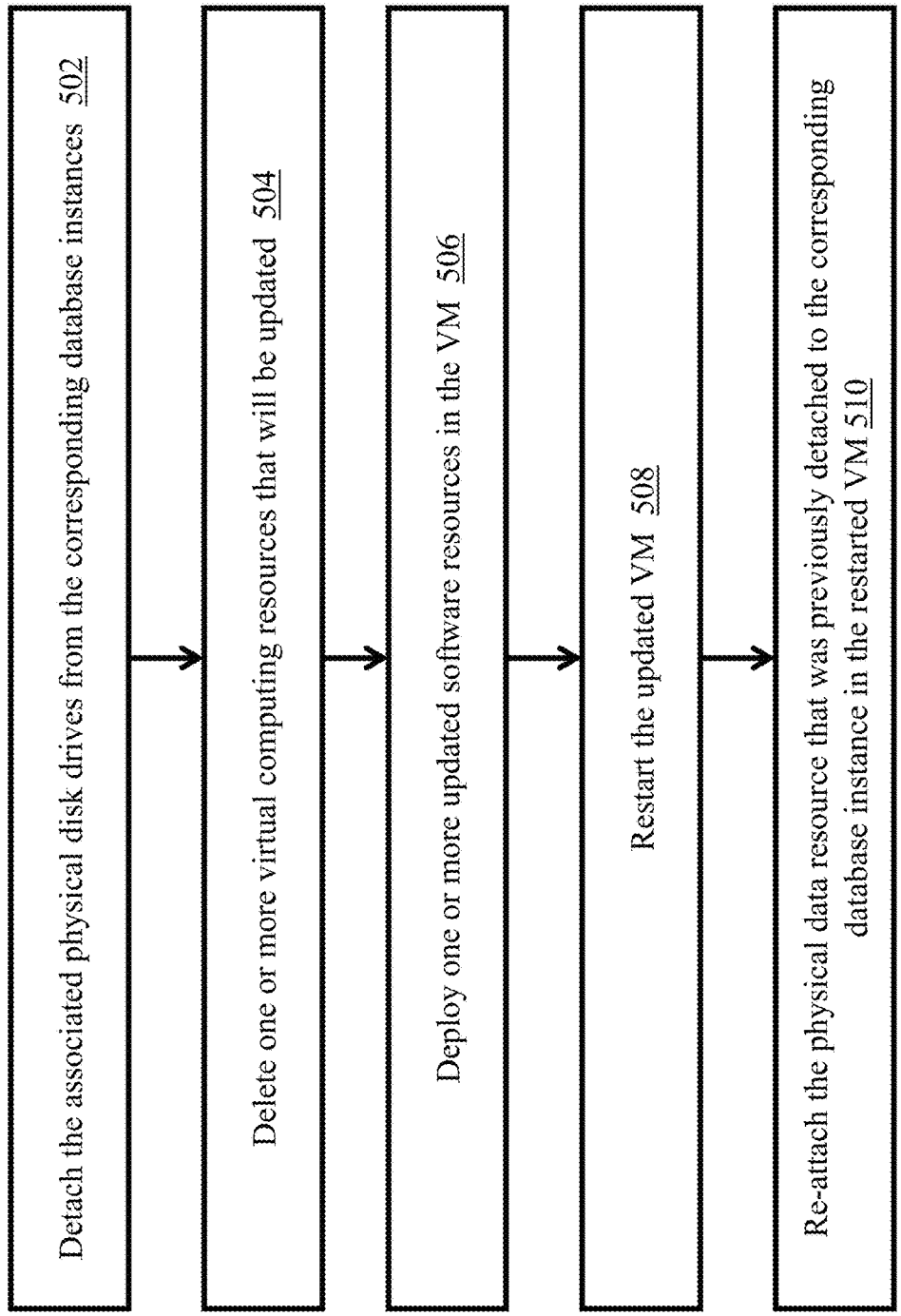
FIG. 5 is a flow diagram of a computerized method of refreshing a virtual machine (VM) and associated elements in a cloud computing environment.

In addition to the above features, the systems and methods described herein provide for seamless updating of the elements 110*a*-110*b*, 112, and 114*a*-114*b* of the database management platform through a process of rehydration. As can be appreciated, existing deployed database management systems may require periodic or emergency software image updates (e.g., when configuration updates are required, when a new database or supporting software version and/or operating system version is released, when a data resource is changed, when a new security patch is released, etc.). Rehydration service 106*d* can be configured to initiate a rehydration process to refresh (step 212 of FIG. 2) one or more of the reserved virtual computing resources in the database management platform in cloud computing environment 108. FIG. 5 is a flow diagram of a computerized method 500 of refreshing a VM 108*a*, 108*b* and associated elements 110*a*-110*b*, 112, and/or 114*a*-114*b* in cloud computing environment 108 via rehydration. In some embodiments, the user at client computing device 102 can interact with rehydration service 106*d* to initiate the rehydration process. In other embodiments, rehydration service 106*d* periodically analyzes the software and resources utilized in each VM 108*a*, 108*b* in the database management platform and determines when to initiate rehydration (e.g., a new software version, database version, or OS version is released; a security patch is ready for implementation, etc.).

Rehydration service 106d detects that one or more of VMs 108a, 108b and/or one or more virtual computing resources within the VMs 108a, 108b needs to be updated. For example, when a new version of software associated with the database management platform is released, provisioning module 106c can be configured to determine that the current version of the operating system software deployed in VMs 108a, 108b is out of date (e.g., by comparing a build number, version number, or other similar indicia). In another example, rehydration service 106d can be configured to determine that a code base associated with database management platform has been modified (e.g., via a build instruction or other indicia from a code development management system and/or issue tracking ticket system). A common rehydration process is to update software associated with VMs 108a, 108b periodically to ensure the latest patches and functionality is contained in the VMs 108a, 108b.

To begin the rehydration process, rehydration service 106d detaches (step 502) the physical disk drive 116a-116n from the corresponding database instance 110a, 110b in the VM 108a, 108b that is being refreshed. Next, rehydration service 106d deletes (step 504) one or more virtual computing resource(s) (e.g., software modules, linked services, libraries, OS components) in the VM 108a, 108b that will be updated via rehydration. In some embodiments, rehydration service 106d can stop/remove the entire VM 108a, 108b from cloud computing environment 108 and deploy a new VM (with updated software) using the same computing resources that were allocated for the VM that was removed.

Rehydration service 106d then deploys (step 506) one or more updated software resources in the corresponding VM 108a, 108b. In some embodiments, rehydration service 106d uses updated resource templates (i.e., newer or changed templates that are different from those originally used to create the VMs 108a, 108b). For example, rehydration service 106d can deploy the new software or services in the VM 108a, 108b using an updated software image file (e.g., an operating system image file or a security patch image file) that was created to deploy the new version of the software and/or virtual computing resource(s) in cloud environment 108. After the new virtual computing resource is created in VM 108a, 108b, rehydration service 106d restarts (step 508) the updated VM 108a, 108b. After rehydration is complete, rehydration service 106d re-attaches the physical data resources (i.e., disk drives 116 that were previously detached) to the corresponding database instance 110a, 110b in the restarted VM 108a, 108b.

Upon deploying a database management platform, provisioning module 106a can validate the deployment to confirm that all components of the database management platform are installed and functioning correctly in the cloud computing environment 108. In some embodiments, the deployment pipeline script executed by provisioning module 106a includes one or more validation steps-whereby module 106a issues requests to cloud computing environment 108 (including but not limited to VMS 108a, 108b and/or the associated elements 110a-110b, 112, 114a-114b) to confirm that the database management platform is operating as expected. In some embodiments, provisioning module 106a can compile and transmit a validation report to a remote computing device (e.g., client computing device 102) that includes deployment details and information on the results of the deployment validation.

As mentioned above, system 100 can implement any or all of the techniques described herein using an automated, script-based approach. For example, provisioning module 106a can be configured to store one or more scripts (see FIG. 4) that comprise a series of instructions to automatically carry out the required steps for the functions described in FIGS. 2, 3, and 5. For example, a user at client computing device 102 can connect to server computing device 106 and initiate execution of one or more scripts to create data orchestration platforms and corresponding virtual computing resource infrastructure, configure the high availability patterns described herein according to specified requirements, enable the synchronization of data across regions, resources and instances, integrate the cloud computing environment with the identity authentication service, and perform rehydration of resources and/or instances in the cloud environment in order to update relevant software. In this way, the methods and systems advantageously provide for the automated provisioning and management of data orchestration platforms in a cloud computing environment to overcome the lack of existing tools to accomplish such deployment.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

The computer program can be deployed in a cloud computing environment (e.g., Amazon® AWS, Microsoft® Azure, IBM® Cloud™). A cloud computing environment includes a collection of computing resources provided as a service to one or more remote computing devices that connect to the cloud computing environment via a service account allowing access to the aforementioned computing resources. Cloud applications use various resources that are distributed within the cloud computing environment, across availability zones, and/or across multiple computing environments or data centers. Cloud applications are hosted as a service and use transitory, temporary, and/or persistent storage to store their data. These applications leverage cloud infrastructure that eliminates the need for continuous monitoring of computing infrastructure by the application developers, such as provisioning servers, clusters, virtual machines, storage devices, and/or network resources. Instead, developers use resources in the cloud computing environment to build and run the application, and store relevant data.

Method steps can be performed by one or more processors executing a computer program to perform functions of the invention by operating on input data and/or generating output data. Subroutines can refer to portions of the stored computer program and/or the processor, and/or the special circuitry that implement one or more functions. Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Exemplary processors can include, but are not limited to, integrated circuit (IC) microprocessors (including single-core and multi-core processors). Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), an ASIC (application-specific integrated circuit), Graphics Processing Unit (GPU) hardware (integrated and/or discrete), another type of specialized processor or processors configured to carry out the method steps, or the like.

Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices (e.g., NAND flash memory, solid state drives (SSD)); magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above-described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). The systems and methods described herein can be configured to interact with a user via wearable computing devices, such as an augmented reality (AR) appliance, a virtual reality (VR) appliance, a mixed reality (MR) appliance, or another type of device. Exemplary wearable computing devices can include, but are not limited to, headsets such as Meta™ Quest 3™ and Apple® Vision Pro™. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN),), a private IP network, an IP private branch exchange (IPBX), a wireless network (e.g., radio access network (RAN), Bluetooth™ near field communications (NFC) network, Wi-Fi™, WiMAX™, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), cellular networks, and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE), cellular (e.g., 4G, 5G), and/or other communication protocols.

Devices of the computing system can include, for example, a computer, a computer with a browser device, a telephone, an IP phone, a mobile device (e.g., cellular phone, personal digital assistant (PDA) device, smartphone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Safari™ from Apple, Inc., Microsoft® Edge® from Microsoft Corporation, and/or Mozilla® Firefox from Mozilla Corporation). Mobile computing devices include, for example, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The methods and systems described herein can utilize artificial intelligence (AI) and/or machine learning (ML) algorithms to process data and/or control computing devices. In one example, a classification model, is a trained ML algorithm that receives and analyzes input to generate corresponding output, most often a classification and/or label of the input according to a particular framework.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for provisioning database management platforms in a cloud computing environment, the system comprising a server computing device having a memory for storing computer-executable instructions and a processor that executes the computer-executable instructions to:
reserve a plurality of virtual computing resources in a cloud computing environment coupled to the server computing device, the cloud computing environment comprising a plurality of regions;
provision a database management platform in the cloud computing environment using the reserved virtual computing resources, the database management platform comprising (i) a primary database instance provisioned in a first region, (ii) a secondary database instance provisioned in a second region; (iii) a database observer instance provisioned in the first region coupled to the primary database instance and the secondary database instance; and (iv) a platform monitor agent provisioned in each of the first region and the second region, including attaching the primary database instance and the secondary database instance to physical disk drives;
configure the database observer instance to monitor availability of the primary database instance and to route traffic to the secondary database instance upon detecting that the primary database instance is unavailable;
integrate the database management platform with an identity authentication service provided by a first computing resource of the server computing device such that authentication of requests to access the database instances is performed by the identity authentication service;
monitor operational status of the database management platform using a monitoring service provided by a second computing resource of the server computing device, the monitoring service coupled to the platform monitor agent in each region, wherein the monitoring service analyze received log files to track characteristics of the database management platform including the operational status; and
refresh one or more of the reserved virtual computing resources in the database management platform using a rehydration service provided by a third computing resource of the server computing device, wherein the server computing device validates the provisioning of the database management system in the cloud computing environment upon completion of the provisioning step and transmits a validation report to a remote computing device upon validating the provisioning of the database management system.

2. The system of claim 1, wherein the server computing device invokes an application programming interface to connect to the cloud computing environment and issue a request to reserve the plurality of virtual computing resources.

3. The system of claim 1, wherein the database management platform further comprises:
(v) an event manager agent provisioned in each of the first region and the second region,
wherein the event manager agent in the first region captures usage and performance metrics for the primary database instance and the event manager agent in the second region captures usage and performance metrics for the secondary database instance, and
wherein each event manager agent is coupled to the monitoring service of the server computing device.

4. The system of claim 3, wherein the database management platform further comprises (vi) a second database observer instance provisioned in a third region of the cloud computing environment, the second database observer instance coupled to the primary database instance and the secondary database instance.

5. The system of claim 4, wherein the database management platform further comprises (vii) a replication agent provisioned in the first region, wherein the replication agent detects changes to data in the primary database instance and replicates the changes in the secondary database instance.

6. The system of claim 1, wherein integrating the database management platform with an identity authentication service comprises:
establishing a connection between the database management platform and the first computing resource of the server computing device; and
coupling the primary database instance and the secondary database instance to the identity authentication service such that authentication of requests to access the database instances is performed by the identity authentication service.

7. The system of claim 1, wherein the server computing device executes a build pipeline script to initiate reserving of the virtual computing resources and provisioning of the database management platform.

8. The system of claim 1, wherein refreshing the reserved virtual computing resources in the database management platform comprises:
deleting one or more reserved virtual computing resources in the database management platform; and
provisioning one or more new virtual computing resources in the database management platform using updated resource templates.

9. The system of claim 8, wherein the updated resource templates comprise an operating system image file or a security patch image file.

10. A computerized method of provisioning database management platforms in a cloud computing environment, the method comprising:
reserving, by a server computing device, a plurality of virtual computing resources in a cloud computing environment coupled to the server computing device, the cloud computing environment comprising a plurality of regions;
provisioning, by the server computing device, a database management platform in the cloud computing environment using the reserved virtual computing resources, the database management platform comprising (i) a primary database instance provisioned in a first region, (ii) a secondary database instance provisioned in a second region; (iii) a database observer instance provisioned in the first region coupled to the primary database instance and the secondary database instance; and (iv) a platform monitor agent provisioned in each of the first region and the second region, including attaching the primary database instance and the secondary database instance to physical disk drives;

configuring, by the server computing device, the database observer instance to monitor availability of the primary database instance and to route traffic to the secondary database instance upon detecting that the primary database instance is unavailable;

integrating, by the server computing device, the database management platform with an identity authentication service provided by a first computing resource of the server computing device such that authentication of requests to access the database instances is performed by the identity authentication service;

monitoring, by the server computing device, operational status of the database management platform using a monitoring service provided by a second computing resource of the server computing device, the monitoring service coupled to the platform monitor agent in each region, wherein the monitoring service analyze received log files to track characteristics of the database management platform including the operational status; and refreshing, by the server computing device, one or more of the reserved virtual computing resources in the database management platform using a rehydration service provided by a third computing resource of the server computing device, wherein the server computing device validates the provisioning of the database management system in the cloud computing environment upon completion of the provisioning step and transmits a validation report to a remote computing device upon validating the provisioning of the database management system.

11. The method of claim 10, wherein the server computing device invokes an application programming interface to connect to the cloud computing environment and issue a request to reserve the plurality of virtual computing resources.

12. The method of claim 10, wherein the database management platform further comprises:
(v) an event manager agent provisioned in each of the first region and the second region,
wherein the event manager agent in the first region captures usage and performance metrics for the primary database instance and the event manager agent in the second region captures usage and performance metrics for the secondary database instance, and
wherein each event manager agent is coupled to the monitoring service of the server computing device.

13. The method of claim 12, wherein the database management platform further comprises (vi) a second database observer instance provisioned in a third region of the cloud computing environment, the second database observer instance coupled to the primary database instance and the secondary database instance.

14. The method of claim 13, wherein the database management platform further comprises (vii) a replication agent provisioned in the first region, wherein the replication agent detects changes to data in the primary database instance and replicates the changes in the secondary database instance.

15. The method of claim 10, wherein integrating the database management platform with an identity authentication service comprises:
establishing a connection between the database management platform and the first computing resource of the server computing device; and
coupling the primary database instance and the secondary database instance to the identity authentication service such that authentication of requests to access the database instances is performed by the identity authentication service.

16. The method of claim 10, wherein the server computing device executes a build pipeline script to initiate reserving of the virtual computing resources and provisioning of the database management platform.

17. The method of claim 10, wherein refreshing the reserved virtual computing resources in the database management platform comprises:
deleting one or more reserved virtual computing resources in the database management platform; and
provisioning one or more new virtual computing resources in the database management platform using updated resource templates.

18. The method of claim 17, wherein the updated resource templates comprise an operating system image file or a security patch image file.

* * * * *